United States Patent Office 3,364,048
Patented Jan. 16, 1968

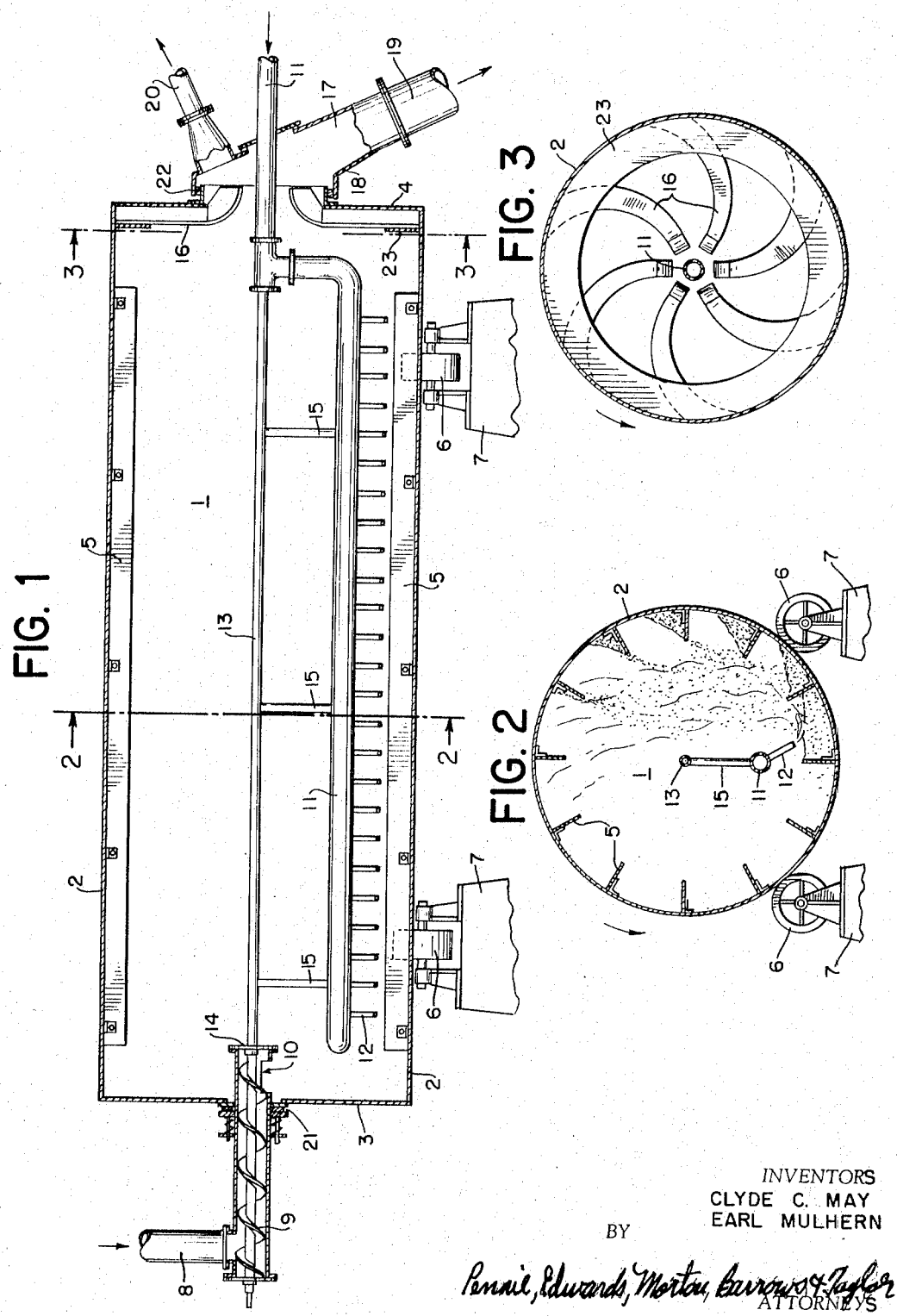
Jan. 16, 1968   C. C. MAY ET AL   3,364,048
TREATMENT OF POWDERED OIL FURNACE BLACK
Filed Dec. 28, 1962   2 Sheets-Sheet 1
INVENTORS
CLYDE C. MAY
EARL MULHERN
BY
Pennie, Edwards, Morton, Barrows & Taylor
ATTORNEYS

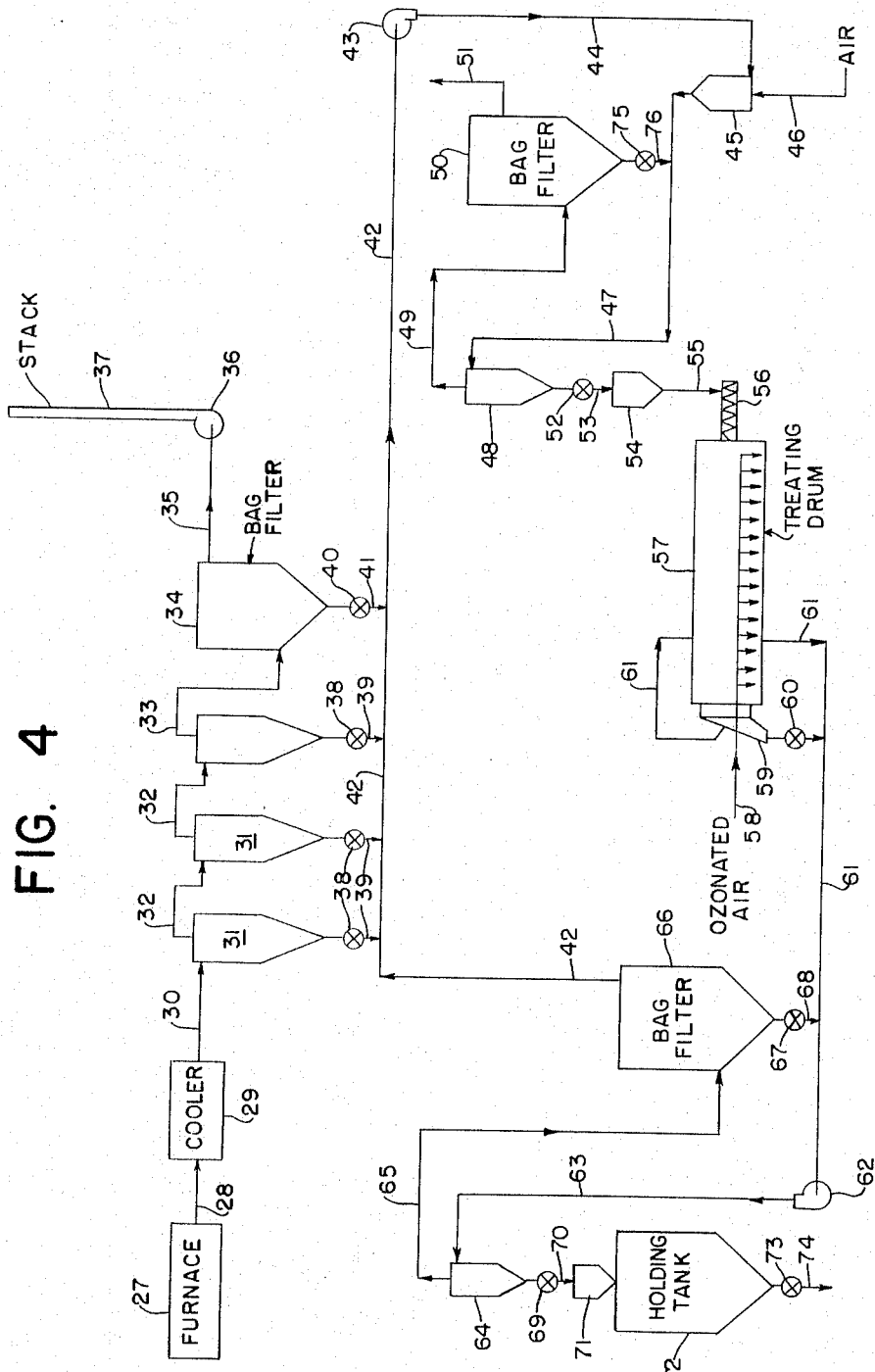

3,364,048
TREATMENT OF POWDERED OIL
FURNACE BLACK
Clyde C. May, Franklin, and Earl Mulhern, Monroe, La., assignors to Columbian Carbon Company, New York, N.Y., a corporation of Delaware
Filed Dec. 28, 1962, Ser. No. 247,912
3 Claims. (Cl. 106—307)

This invention relates to the treatment of powdered materials with gases. More particularly, it relates to improvements in processes for treating powdered pigments whereby the pigment is brought into intimate, controlled contact with a treating gas and certain selected characteristics thereby imparted to the pigment, in accordance with the use for which it is intended. The process has been found especially useful as applied to the production of long-flow, high-color ink blacks by treating selected powdered furnace carbon blacks with gaseous ozone and will be particularly illustrated herein with respect to such application.

Very finely subdivided materials such as carbon black, metal oxides, and other particulate colloid substances, herein broadly referred to as "powdered pigments," are widely used in rubber, paints, inks, plastics and the like, for reinforcing, coloring, or rheological effects. It is well-known by those skilled in the arts, that the physical and chemical surface characteristics of such pigment particles strongly influence the processability of the pigment in specific compounding formulations as well as the performance characteristics of finished compositions of manufacture in which the pigment is incorporated.

It has previously been proposed to treat powdered or pelleted pigments, for instance, carbon black, with reactive gases to change the nature of the pigment particle surface through chemical reaction and/or chemisorption of the gas. It is known that the properties imparted to a composition of manufacture by the carbon may be drastically altered thereby. Carbon black, for example, may be treated with heated free-oxygen containing gases, such as air, or with nitrogen oxides, to increase its volatile content, lower its pH and thereby increase the scorch and cure time of rubber or increase the color and flow of printing inks in which the carbon is used.

Colloidal pigments, other than carbon blacks, which have extensive and gas reactive surfaces include fumed and precipitated silicas, aluminas, titanias, iron oxides and the like.

Some of the pigment-reactive gases which may be used to alter the chemical surface characteristics of such pigments include: oxygen, ozone, nitrogen oxides, ammonia, halides, oxyhalides, sulfur oxide, and the like, and all such gases are herein referred to as "reactive gas." Other gases, inert to the reactive gas or the pigment powder, and broadly herein referred to as "Carrier Gas," may be used as a diluent and carrier medium when it is undesirable to use the pigment reactive gas in pure form. The term "treating gas" is used herein in reference to a pigment reactive gas or a mixture of a reactive gas and a carrier gas.

Although most powdered pigments may be formed into freely flowing beads or pellets, the treatment of such pellets, or combined operations involving treating and pelleting simultaneously, are to be avoided in accordance with our present invention. We have found that pigments can be treated most uniformly in the powdered form. When a pelleted pigment is desired, such as in the formulation of carbon black-reinforced rubbers, it is often possible to pelletize the pigment powder after the treating operation without detrimentally affecting the beneficial properties imparted by the treatment. But treatment of preformed pellets tends to result in considerable accretion of the pigment particles, and the pellets become so hardened that it is difficult if not impossible to effect an intimate contact between the reactive gas and the densely packed particles within the interior of the pellet. Hardening of the pelleted pigment may also greatly reduce its pulverulence, which may be highly undesirable when the pigment is to be used in printing inks, reinforced rubbers, or other compounds which require a rather thorough and uniform internal dispersion of the pigment.

Commercial processes for treating powdered colloid pigments with reactive gases have, in many cases, not been fully satisfactory. Systems in which the gas is passed through a static bed of the powder require elaborate and complex means for distributing the gas to assure that pigment particles are adequately contacted and uniformly treated. When fluidized beds are employed on the other hand, the extensive agitation inherent in these operations frequently causes excessive pelletization or agglomeration of the powder.

Control over the fluidizing is also complicated by the relatively low bulk density of the particles. The velocity of the fluidizing gas must be kept low in order to prevent aerosol formation, which results in the powder being swept out of the bed with the effluent gas. Reduction of the gas velocity to levels which are subcritical to the formation of stable aerosols frequently results in channeling.

There has previously been proposed a process for treating carbon black whereby an oil furnace carbon black is separated from the furnace effluent gases and resuspended in a hot gas stream containing 1 to 10%, by volume, of molecular oxygen to form an aerosol, the aerosol being maintained until the volatile content of the carbon black is raised appreciably. The carbon black is then separated from the treating gas in a fluffy condition, and is alleged to give longer cure and scorch time in rubber and increased flow and color in inks. Though such procedure permits very intimate contacting of the pigment powder with the treating gas while preventing the formation of pellets, a primary disadvantage is an innate dependence upon gas momentum to maintain the aerosol in which the treatment takes place. Strong dependence upon the amount of gas used to form the aerosol, gas velocity, bulk density of the pigment powder and other factors seriously limit the capacity and flexibility of such presently available systems wherein pigment powders are treated with a reactive gas in the aerosol phase.

It has also been proposed to treat carbon black with a reactive gas by passing the reactive gas in contact with an agitated, rolling bed of carbon black pellets in a tumbling drum, of the type used in the pelleting of carbon black, or to pass the reactive gas in contact with the surface of a bed of carbon black while it is being pelleted in such tumbling drum by the rolling, tumbling action of the carbon black bed. Though an operation of that sort avoids a number of the difficulties experienced where the carbon black is treated in aerosol phase, it is highly objectionable and unsuited for purposes of our present invention for the reasons previously noted herein.

Our present invention provides an improved process for treating powdered pigments with a reactive gas, whereby the difficulties and disadvantages experienced in the previously proposed treating method are avoided and a modified pigment of high uniformity in a powdered, readily dispersible form may be readily and economically obtained.

In accordance with our present invention, contact between the powdered pigment and the treating gas is effected by causing the pigment to fall by gravity, in a dispersed state, through a relatively quiescent body of the treating gas. From a practical consideration, and in order to obtain adequate contact time, the powdered pigment is, with advantage, caused to fall repeatedly through the body of treating gases by repeatedly elevating the partially treated powdered pigment and again dropping it through the body of treating gas. Various types of apparatus are available for carrying out the treatment comprising a treating chamber and elevating means. However, in order to obtain uniform exposure of the pigment to the treating gases, it is important that no substantial stagnant body of the pigment be permitted to accumulate during the treatment.

Though the invention is not restricted to any particular apparatus employed, we have, with advantage, carried out the treatment by passing the powdered pigment at a uniform rate into one end of, and through, a horizontally elongated drum provided internally with a multiplicity of longitudinally-positioned baffle plates or vanes extending radially inwardly from the periphery of the drum so that, when the drum is slowly rotated, the separate segments of the powdered pigments therein are carried upwardly, with a minimum of rolling impact, and finally dropped through the atmosphere of reactive gases maintained within the drum.

While slowly rotating the drum, the pigment powder and the treating gas may be continuously fed into its interior at a constant rate. The freshly introduced powder falls to the floor of the drum and occupies the spaces between the longitudinal baffles. As the feeding of the pigment and rotation of the drum continue, the powder distributes itself along the drum floor, and forms a series of beds within the spaces between the longitudinal baffles.

As the drum rotates, the imparting of rolling or tumbling action to the powder in the beds is substantially inhibited by the curbing effect of the fixed flights, so that the tendency for pelletizing of the pigment particles is greatly reduced or negated. As the drum continues to rotate, the flights reach angles of inclination where the powder is no longer curbed, and it gradually spills over the edge of the flight and the powder particles are thus subjected to a gravity-motivated free fall through the interior space of the drum above the powder beds, which space is kept flooded with a relatively quiescent body of the treating gas. As the particles separate and disperse while falling over the edges of the vanes and through the quiescent gaseous body, a highly efficient reaction ensures as the particles are surrounded by the reactive gas. The fall of the particles is finally arrested when they reach the floor of the drum or one of the powder beds. Continued rotation of the drum results in repeated lifting and dropping of the powder, and consequently, repeated exposure of the particles to the reactive gas.

A distinct advantage in this invention is the absence of considerable or continuously mechanical action imparted to the powder bed, so that structural damage to the pigment and aggregation or pelletizing of the particles is avoided.

A further advantage of the invention resides in the fact that a thorough, or partial, uniform treatment of the pigment powder may be assured through regulation of total contact time with the reactive gas, since the residence time of the powder within the drum is easily regulated by varying drum length, rotational speed of the drum, feed rate and the like.

Yet another advantage of this invention is the fact that efficient solid-to-gas contacting is not dependent upon the velocity of the treating gas through the confines of the treatment vessel, since in accordance with this invention the velocity of the gas within the vessel may, in fact, be kept quite low. Suspension of substantial amounts of the powdered pigment within the treating gas is avoided to prevent considerable quantities of incompletely treated pigment from being carried out of the vessel entrained in the effluent gases therefrom, e.g., non-reacted treating gases.

The powder undergoing treatment may be retained in the drum from several minutes to several hours, and the process may be readily adapted for continuously producing large quantities of treated pigment powder. The treating temperature is subject to considerable variation depending primarily upon the pigment being treated, the reactive gas used and the desired characterisitcs of the resultant product. Temperature and time of contact will usually be found to be interdependent.

The invention will be further described and illustrated with reference to the accompanying drawings, but it will be understood that the embodiments illustrated are considered only to be presently preferred means of practice, and the invention is not limited by the specific apparatus or process arrangements illustrated.

Referring to the drawings:

FIG. 1 is a longitudinal cross-section of a rotating drum treater and its auxiliary apparatus.

FIG. 2 is a transverse section along the line 2—2 of FIG. 1,

FIG. 3 is a transverse section along the line 3—3 of FIG. 1, and

FIG. 4 is a diagrammatic flow sheet illustrating how the apparatus of FIG. 1 may, with advantage, be incorporated in a process for commercially producing high color, long flow carbon blacks by treating selected powdered rubber grade oil furnace carbon blacks with an ozone-containing gas stream.

Referring particularly to FIG. 1, the interior space 1 of the drum is bounded by a cylindrical wall 2, and end plates 3 and 4. Affixed longitudinally along the interior of wall 2 is a series of powder-lifting flights 5. The drum may, for instance, be mounted on trunnion rolls 6 supported by any suitable foundation, such as concrete pillars 7. Any preferred means may be employed to rotate the drum about its longitudinal axis. A ring gear, for example, may be placed around the circumference of the drum wall 2 and meshed with a mating gear which transfers the necessary rotational force, or alternately, one or more of the trunnion rolls 6 may be rotated to supply the force directly to the wall 2, all as well-known in the art.

Powdered pigments may be fed into the drum through conduit 8, a helicoid conveyor 9 and the conveyor discharge outlet 10. The treating gas may be fed into the interior of the drum through conduit 11 and a series of discharge nozzles 12. Conduit 11 may be supported and stabilized inside the drum by means of hanger 13 having one end affixed within a bearing on the end plate 14 of the helicoid conveyor 9. Stabilizer bars 15 connect the conduit 11 with the hanger 13 to form a rigid treating gas distributor system around which the drum revolves.

The nozzles 12 may, with advantage, be fixed at an angle which permits discharging the treating gas against the surface of the powder bed in such a manner that the gas is then deflected from the surface in a direction which enhances contact with the falling powder. Such an arrangement is illustrated in FIG. 2.

At the discharge end of the drum there may be affixed a series of scoops or dippers 16, which lift and pour the treated powder from the drum interior 1 into a drum effluent discharge space 17 within bonnet 18. The treated powder falls into the powder discharge conduit 19 and is removed thereby to an additional processing unit, such as a pelletizer, or it may be conveyed to a storage bin or packaging machine. Expended treating gas may be removed from the drum through conduit 20 wherein it may be conveyed to an atmospheric vent, a powder and/or gas recovery unit or it may be used in an additional processing step, such as a system in which the expended treating gas is used in pneumatically conveying pigment powder from one location to another.

In order to prevent leakage of the pigment powder and the treating gas out of the drum into the atmosphere, rotary seals 21 and 22 are located between the affiliated rigid and rotational members.

The drum and its auxiliary apparatus may be constructed from any suitable material having resistance to attack by the pigment powder and the treating gas.

Although batches of the pigment powder may be treated in the drum in accordance with the invention, the arrangement illustrated is particularly suitable for continuous operation. The powder may be fed at a constant and measured rate through conduit 8 and conveyor 9 into the drum interior 1. Simultaneously, the treating gas may be fed into the drum at a constant and measured rate through conduit 11 and the discharge nozzles 12.

It is important to the operation that the drum be rotated at a speed which is sufficiently low to prevent excessive dusting or clinging of the powder to the drum wall through the action of centrifugal force. The optimum speed is one which affords a gentle lifting of the powder upon the flight, followed by a complete but gradual spilling of the powder from its surface after the angle of repose is exceeded. Similarly, it is important that the treating gas not be jetted too rapidly from the discharge nozzles 12, otherwise excessive suspension of the powder within gas may occur. Regulation of the treating gas discharge velocity may be accomplished primarily by adjusting the number and size of the discharge nozzles employed.

The residence time of the powder within the treating drum may be regulated primarily by the length of the drum employed, rotational speed of the drum, and its angle of inclination from horizontal. Although the powder will flow out from the discharge end of the drum without the drum being inclined at all, the rate of travel from one end to the other can be increased by lowering the discharge end, and within certain limits, by increasing the rotational speed of the drum.

The volume of the powder bed maintained within the drum may be regulated by the internal diameter of the dam 23, e.g., as the diameter of the opening through the dam is reduced the volume of powder retained within the drum is increased. With untreated powder being fed to the drum continuously during the treating operation, the repeated lifting and pouring action of powder by the flights 5 serve to continuously blend the freshly introduced and untreated powder with that retained in the beds, so that the powder discharging from the drum is a mixture of pigment particles which have been exposed to the treating gas for various periods of time. We have found, however, that very uniformly performing treated powders can be produced in this manner provided that a sufficient quantity of treating gas is used in conjunction with a sufficient time of residence and provided that a suitable quantity of the pigment powder is retained within the beds to thoroughly dilute the powder which is freshly introduced into the drum. Very successful results may be obtained even when it becomes necessary to employ very small quantities of the treating gas diluted by a carrier gas.

As a further precaution against excessive suspension of the pigment powder in the treating gas, which would result in a loss of the powder out of the drum while entrained in effluent treating gas, the drum volume should be sufficiently large to permit circulation of the required flow of treating gas at velocities which are subcritical to the formation of stable aerosols comprising appreciable amounts of the powder in the treating gas.

Where it is desired that the treating process be augmented by heat, the necessary heat may be furnished directly through the wall of the drum or in some cases it may be supplied by preheating the treating gas stream, i.e., when the gas is thermally stable, before contacting it with the powder, or, both methods may be used in combination.

Contrariwise, when the reaction between the powder and the reactive gas is one which creates exothermic heat, which may have deleterious effects on the reaction or the treated product, a cooling medium such as air may be circulated over the wall of the drum, and supplementary cooling surfaces may be placed within the drum interior.

In FIG. 4, an operation is shown illustrating how our powder treating method of the present invention may be utilized for producing high color, long flow carbon blacks by treating selected, oil furnace rubber grade carbon blacks with ozone.

Carbon black is produced at a constant rate in a furnace, represented at 27, by the pyrolysis of a petroleum or creosote oil. Carbon black and the furnace flue gases are conveyed from the furnace by line 28 to a cooler or quench tower, represented at 29, wherein the temperature of the carbon-gas mixture is substantially reduced before being passed through line 30 to a series of cyclone separators, represented at 31 and interconnected by lines 32, wherein the majority of the carbon black is separated from the flue gases. In order to effect a substantially complete separation and recovery of the freshly produced carbon black powder the effluent from the cyclones is conveyed through line 33 to a bag filter, represented at 34. The carbon-stripped flue gases are removed from the bag filter through line 35 and are vented to the atmosphere through a stack, represented at 37.

A gas fan or blower 36 supplies the motivating force to convey the carbon black and the furnace flue gases from the furnace and through the cooler and separator system.

The carbon black is removed from the cyclone separators and the bag filter through gas tight rotary locks represented at 38 and 40, and passed through lines 39 and 41 into line 42.

In treating the carbon black, ozone is used as the reactive gas, and may be diluted with dried air which serves as a conditionally inert carrier medium for the ozone.

In the process illustrated in FIG. 4, and as will be further explained, the treating gas, e.g., an ozone-dry air mixture, is first contacted with the carbon black in the treating drum, is removed therefrom substantially depleted in ozone content, and is then further utilized, in succession, to pneumatically convey the treated carbon black powder to a packaging machine, for instance, and to convey freshly produced carbon black to the inlet of the treating drum before being finally discharged to the atmosphere.

The ozone with which the carbon black is treated may be produced by any known means, for instance, by discharging electrical energy through a flowing stream of air having a very low atmospheric dew point for moisture. Ozonization of a portion of the oxygen in the air in this manner results in an ozone-containing dry air stream which may contain 1% to 3% by weight of ozone.

The ozonated air stream is conveyed through line 58 into the treating drum, represented at 57. Contacting of the carbon black with the treating gas is accomplished according to the methods previously described in reference to FIGS. 1 through 3. The ozone-depleted dry air stream is removed from the drum through line 61, while the treated carbon black powder is removed from the drum through a discharge spout 59, and is passed through a rotary lock 60, into line 61. An aerosol is formed of the treated carbon black and the ozone-depleted air stream, and said aerosol is propelled through line 61 by a gas blower 62, and is conveyed through line 63 to a cyclone separator 64. The majority of the ozone-treated carbon black powder is separated from the air stream by the cyclone separator and is passed through a gas-tight rotary lock 69, and line 70 to a micropulverizer, represented at 71, which discharges the carbon into a holding tank 72. The ozone treated, powdered carbon black is removed from the holding tank through a valve 73 and is passed through line 74 to a packaging machine, storage bin, pelletizer, or other additional processing step.

The ozone-depleted air stream which leaves the cyclone represented at 64 may have entrained therein some of the treated carbon black powder, so that the air stream is conveyed by line 65 to a bag filter, represented at 66, whereby the carbon black is substantially completely separated from the air stream.

Effluent gas from the filter 66 is passed therefrom through line 42, while the treated carbon black is removed through a rotary lock 67, and line 68, and is discharged into line 61 wherein it is mixed with the carbon black and ozone-depleted air passing from the treating drum.

The freshly manufactured carbon black passing from the collection cyclones 31 and the bag filter 34 into line 42 is picked-up by the ozone-depleted air stream passing from the bag filter 66. Suspension of the carbon black within the air stream occurs within line 42, and the resultant aerosol is conveyed therein to a gas blower, represented at 43, and through line 44 to an air-swept screen, or bolter, represented at 45. Objectionable particles of foreign solid materials, such as refractory grit, rust and scale, are removed from the powdered carbon black by the screen, which is continuously swept by high-velocity jets of air supplied through line 46. The flow of air supplied through line 46 is, in the normal case, of a substantially smaller quantity than the carbon-ladened, ozone-depleted air stream supplied to the screen through line 44.

Leaving the screen through line 47 is an aerosol comprising the freshly manufactured carbon black powder, the sweeping air supplied to the screen and the ozone-depleted air stream. This aerosol is introduced into a cyclone separator, represented at 48, wherein the majority of the carbon black is separated from the air, and thereafter passes through a gas-tight rotary lock 52, and line 53 to a micropulverizer represented at 54. The carbon black powder leaves the micropulverizer through line 55 and is introduced by a helicoid conveyor, represented at 56, into the treating drum 57.

The air stream passing from the cyclone separator 48, through line 49, may still contain some carbon black powder which is recovered by the bag filter represented at 50. The expended air stream is removed from the filter through line 51, while the carbon black powder is removed through an air lock 75 and line 76 and discharged into line 47, and becomes mixed as a constituent of the aerosol passing to cyclone separator 48.

Although substantially depleted in ozone, the air stream from the treating drum 57 remains very dry. This condition is utilized to advantage when this dry air stream is used to form an aerosol in line 42 with the freshly manufactured carbon black. Substantial quantities of moisture and volatile gases are elutriated from the surface and the interstices of the fluffy, powdered carbon by this very dry air, and are removed from the system through line 51 admixed with the expended air stream. This elutriation increases the reactivity of the powdered carbon particles with ozone by exposing chemically reactive sites on the surface of the particles which were blocked or occupied by the moisture or other volatile substances.

It should be pointed out, however, that although the elutriating step is highly advantageous, it is not essential to the obtaining of a reaction between the carbon and the reactive gas, nor, for that matter, is the use of freshly produced carbon blacks essential. Aged carbon black powders and even powders reformed from aged pellets have been found to work advantageously, but they may not necessarily respond to treatment so readily, nor result in treated powders having quality equivalent to those formed from the freshly manufactured and elutriated material.

The micropulverizers, represented at 54 and 71, though not essential to the invention, may be used advantageously to assure a uniform smoothness of the carbon black powder introduced into the treating drum and the treated product holding tank, as the formation of soft aggregates and caking of the powder may occur to a slight extent within the conveying and treating apparatus.

The invention, and its effectiveness, as applied to the treating of carbon black with ozone will be illustrated by the following specific example.

A fluffy, ISAF type oil furnace carbon black was fed into a rotating treating drum, of the type described, at the rate of 51 lbs./hr. Simultaneously, an ozone-containing dry air stream was fed into the drum at the rate of 3600 s.c.f.h. The ozone concentration of the dry air stream was about 1% by weight. The treating drum had an internal diameter of 3 feet, a length of 24 feet and contained 11 equispaced flights extended longitudinally over the length of the drum interior, the flights projecting into the drum for a distance of 4 inches. Rotational speed of the drum was maintained at about 2 r.p.m. The temperature of the treating gas and the carbon black within the drum was maintained at about 97° F. The dam at the discharge end of the drum had an internal diameter of 28 inches. Treated carbon black was removed from the drum and passed to a holding tank through a helicoid conveyor and bucket elevator. The effluent air stream from the treating drum was found to be essentially free of ozone content, but did contain a small quantity of carbon black in suspension. Before being expended into the atmosphere, the effluent treating gas was passed through a cyclone separator wherein essentially all of the carbon black was removed from the gas. The separated carbon black was removed from the cyclone through an air lock and passed to the holding tank. After 22 consecutive hours, the treating operation was suspended. 1,034 lbs. of treated carbon black was recovered and packaged in a fluffy, powdered condition. Bulk density of the powdered carbon black was found to be about 9 lbs./cu. ft. both before and after treatment.

Colloidal properties of the carbon before and after treatment are shown in Table I:

TABLE I

|  | ABC Color | Tinting Strength, Percent FF | Stiff Paste Oil Absorption | Iodine Adsorption | Diphenyl-guanidine Adsorption | pH |
| --- | --- | --- | --- | --- | --- | --- |
| Before Treatment | 147 | 125 | 12.2 | 136 | 8.9 | 4.25 |
| After Treatment | 150 | 123 | 12.0 | 70 | 31.2 | 0.95 |

These data show that the carbon black underwent almost no physical change during the treatment, as is evidenced by essentially equivalent color, tint and oil absorption values obtained before and after treatment.

The iodine, diphenylguanidine and pH values were significantly changed, however, and these tests are widely used in the industry to measure what are generally considered to be surface chemistry phenomena. Their importance is indicated by the test data shown in Table II which were obtained from inks made from a standard long-flow ink black (Peerless Mark II), the treated black, and the non-treated black.

TABLE II.—22% BLACK LOADING IN LITHO 3 VEHICLE

| Ink | Carbon Black | Litho Color | Litho Tone | Litho Flow, inches | LaRay Vis., poises | LaRay Yield Value, dynes/cm.² |
|---|---|---|---|---|---|---|
| No. 1 | Peerless Mark II | 0 | Blue | 10.6 | 122 | 2,200. |
| No. 2 | Treated Carbon Black. | +10 | do | 10.7 | 105 | 2,200. |
| No. 3 | Non-Treated Carbon Black. | −25 | Brown | None | Very High | "Buttery" Mix. |

It is quite apparent, therefore, that the nature of the carbon black was materially changed by the described treatment with ozone within the drum. Since the untreated material imparted brown tone, excessive viscosity, and insufficient jetness to the ink mix, it could not have successfully been used as a substitute for the standard flow black. The treatment, however, effected a black having the highly desirable imparted properties of greater jetness, lower viscosity, blue tone, and flow and yield value equivalent to those of the standard.

We claim:

1. In the process for treating powdered oil furnace carbon black with ozone to alter the surface characteristics of the furnace black particles, the method for effecting intimate contact between the furnace black particles and the ozone in which substantial aggregation of the furnace black is avoided which comprises maintaining within an elongated, rotatably-mounted, cylindrical treating chamber a relatively quiescent body of the ozone and a plurality of partitioned beds of the powdered furnace carbon black extending longitudinally along substantially the entire length of said cylindrical treating chamber, continuously rotating the treating chamber, thereby continuously elevating the respective beds of powdered furnace black consecutively and allowing the furnace black particles composing said partitioned beds to fall by gravity in a dispersed state through the quiescent body of the ozone within the chamber, the rate at which the furnace black particles are elevated being such that no substantial stagnant body is permitted to accumulate during the treatment and no substantial tumbling and cascading of the furnace black particles occurs within each of said partitioned beds during such elevation to the point at which the furnace black particles fall by gravity whereby substantial aggregation of the furnace black particles is inhibited, and continuing the operation until the desired alteration of the surface characteristics of the furnace black is obtained.

2. The process of claim 1 in which the ozone within the chamber comprises from about 1% to about 3%, by weight, of ozone in dry air.

3. The process of claim 2 including the steps of:
(a) continuously feeding said oil furnace carbon black and said ozone into said chamber while treated furnace carbon black powder and an ozone depleted dry air stream are continuously removed therefrom;
(b) suspending said oil furnace carbon black within said ozone depleted dry air stream removed from said treating chamber in step (a), to reduce the moisture and other volatile content of said oil furnace carbon black, by elutriation, prior to contact of said oil furnace carbon black with said ozone during step (a), and
(c) separating said oil furnace carbon black that is suspended in step (b) from the air prior to feeding said oil furnace carbon black into said chamber in accordance with step (a).

References Cited

UNITED STATES PATENTS 2,005,022 6/1935 Damon _____ 23—209.9
2,707,674 5/1955 Sweitzer _____ 106—307
3,107,150 10/1963 Angerman _____ 106—300

OTHER REFERENCES

Mantell: Industrial Carbon, 2nd edition, published by Van Nostrand Co., New York, 1946, pp. 53–56 and 70.

Rose et al.: The Condensed Chemical Dictionary, 4th edition, published by Reinhold, 1950, p. 494.

TOBIAS E. LEVOW, *Primary Examiner.*

JAMES E. POER, *Examiner.*

S. E. MOTT, *Assistant Examiner.*